United States Patent [19]

Wachi et al.

[11] Patent Number: 4,951,272
[45] Date of Patent: Aug. 21, 1990

[54] SYSTEM AND METHOD FOR ACCESSING TRACKS FOR OPTICAL DISC APPARATUS

[75] Inventors: Shigeaki Wachi, Tokyo; Sumihiro Okawa, Kanagawa, both of Japan

[73] Assignee: Sony Corporation, Tokyo, Japan

[21] Appl. No.: 271,918

[22] Filed: Nov. 16, 1988

[30] Foreign Application Priority Data

Nov. 20, 1987 [JP] Japan ................................ 62-291686

[51] Int. Cl.⁵ .............................................. G11B 21/08
[52] U.S. Cl. ............................... 369/44.11; 360/78.06; 360/78.05
[58] Field of Search ........................ 369/32, 33, 43–47; 250/201; 358/907; 360/78.01, 78.04, 78.05, 78.06

[56] References Cited

U.S. PATENT DOCUMENTS 4,422,113 12/1983 Mabon .............................. 360/78.13
4,796,246 1/1989 Tsuyoshi et al. ..................... 369/44

Primary Examiner—Robert L. Richardson
Attorney, Agent, or Firm—Ronald P. Kananen

[57] ABSTRACT

A system and method for accessing tracks for an optical disc apparatus are disclosed in which when a light spot is jumped toward a target track, an acceleration pulse is applied across a fine tracking actuator to accelerate the fine tracking actuator for a predetermined period of time, a relative speed of the light spot to the tracks of the optical disc is detected though a detection of a period of a traverse signal outputted due to a movement of the fine tracking actuator, and a control signal corresponding to the relative speed is used to control the movement speed of the fine tracking actuator. Therefore, before the end of a track jump, a constant relative speed can be achieved such that a smooth tracking servo can be carried out. Consequently, an access time to access the target track can be shortened.

8 Claims, 5 Drawing Sheets

FIG.2(A) JS

FIG.2(B) SON

SYSTEM AND METHOD FOR ACCESSING TRACKS FOR OPTICAL DISC APPARATUS

BACKGROUND OF THE INVENTION

1. Field of the Invention

The present invention relates to a system and method for accurately accessing a target one of the tracks formed on an optical disc. The track accessing system and method can smoothly read information from an optical disc.

2. Background of the Art

An access method for accessing a desired track during a playback (or during recording) of an optical disc includes a combination of one track jump, jumping a light spot over one track, a multiple track jump jumping the light spot over 10 to 100 tracks at one time, and a large track jump moving a whole optical head in response to individual jump instructions.

FIG. 6 shows a relationship between an optical disc and tracks during an operation of the multiple track jump.

When a light spot placed on a track $Q_1$ is jumped toward a track $Q_2$, a number of tracks N over which the light spot is traversed is calculated. Then, an acceleration pulse having a pulsewidth $T_a$ corresponding the calculated number of tracks N is supplied to a fine tracking actuator (hereinafter, simply referred to as an actuator), as shown in FIG. 7.

Thereafter, when a deceleration pulse having a pulsewidth $T_b$ substantially the same as that of the acceleration pulse is applied to the actuator, a brake is applied to the actuator so as to reduce a relative speed V between the optical disc and light spot to zero. Consequently, the light spot can jump the multiple number of tracks N access to the track $Q_2$ from the track $Q_1$.

On the other hand, such an access method as will be described below has been proposed.

That is to say, when the acceleration pulse $P_a$ is applied to the actuator in response to the corresponding jump instruction and the light spot is moved at a predetermined speed V, the number of pulses of traverse signals $S_t$ outputted when the light spot traverses one of the tracks are counted. The counted number reaches $N-1$ with respect to a desired number N. At this time, a brake pulse $P_b$ is applied to attenuate the speed and a track servo circuit is closed to complete the access operation, as shown in FIG. 8.

However, since, in the above-described multiple track jumping method, after the actuator of an optical head is accelerated, no monitoring is carried out for the relative or traverse speed between the tracks in the optical disc and light spot, both a distance of track jump and the relative speed are not constant under an influence of a spring position of the actuator before the jump of the light spot and vibrations during the jump of the light spot. Therefore, a smooth drawing-in of the corresponding track position is not always carried out.

In addition, since a center of rotation does not coincide precisely with an optical disc track and there is an eccentricity between the center of rotation of the disc and the disc track, the relative speed between the optical disc and the light spot is varied, overpassage through the target track occurs, and the traverse speed becomes zero immediately before the target track. In extreme cases, the drawing of the tracking servo becomes impossible.

Although a speed sensor is mounted in a tracking actuator to control the traverse speed, a cost of manufacturing the access system becomes accordingly increased and responsiveness of the actuator becomes reduced.

SUMMARY OF THE INVENTION

It is an object of the present invention to provide an inexpensive system and method for accessing tracks on an optical disc which achieve a smooth drawing of a tracking servo in a target track with a short accessing time.

The above-described object can be achieved by providing the system and method for accessing the tracks in which means for detecting a period of a traverse signal to detect a relative speed between the optical disc and light spot after acceleration of the actuator, for example, when a track jump over 10 to 100 tracks is carried out is provided so that a control over a traverse speed is carried out. Thus, such an access operation is carried out that the relative speed immediately before the completion of the track jump becomes a desired speed.

Consequently, since the relative speed when the multiple track jump for the target track is carried out is controlled through a closed loop feedback, e.g., a braking control for one track jump is carried out. A smooth tracking servo state is achieved at a target track position and the access time can be shortened.

BRIEF DESCRIPTION OF THE DRAWINGS

FIGS. 2 (A) through 2 (H) are waveform charts of signals for explaining an operation of the track accessing system shown in FIG. 1.

DETAILED DESCRIPTION OF THE PREFERRED EMBODIMENTS

Reference will hereinafter be made to the drawings in order to facilitate an understanding of the present invention.

Figure 6:
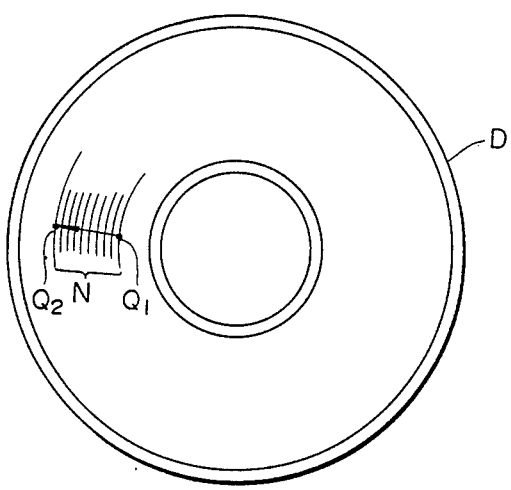
FIG. 6 is an explanatory view of a multiple track jump carried out in a previously proposed accessing method.
Figure 7:
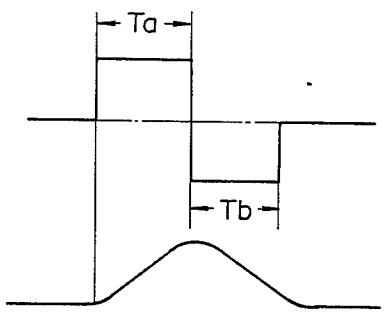
FIGS. 7 and 8 are waveform charts for explaining the operation in the previously proposed accessing method.
Figure 8:
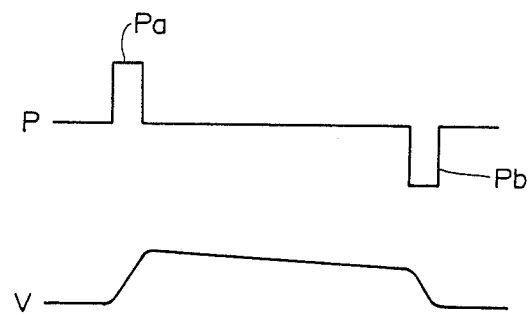

An access operation to a target track during a multiple track jump in a case of a previously proposed track accessing system and method has been described with reference to FIGS. 6 to 8.

Figure 1:
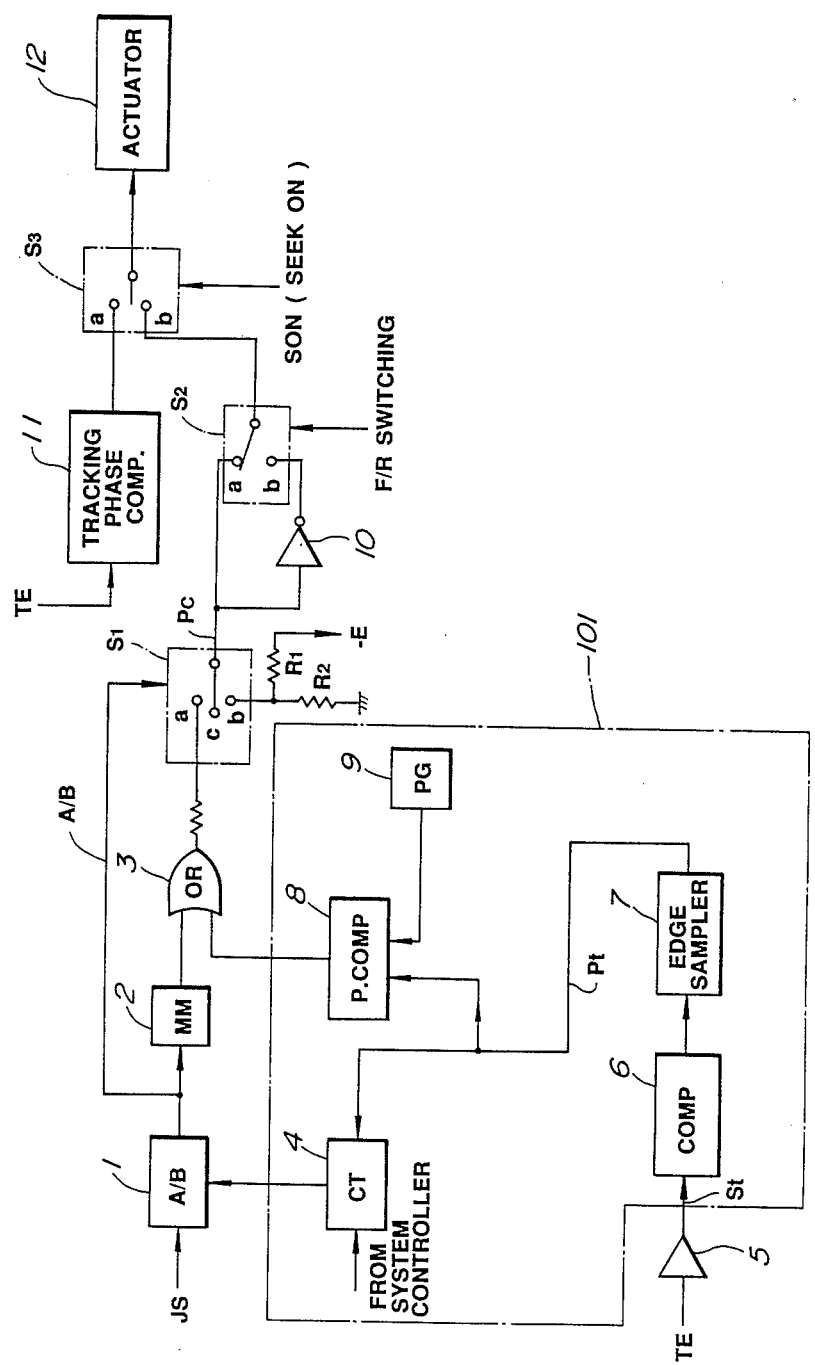
FIG. 1 is a schematic circuit block diagram of a system for accessing tracks for an optical disc apparatus in a first preferred embodiment according to the present invention.

FIG. 1 shows a circuit block diagram of a system for accessing tracks for an optical disc.

In FIG. 1, a track jump control signal is outputted from a jump control circuit 1. An initial acceleration pulse $M_1$ having a predetermined pulsewidth is outputted from a monostable multivibrator (MM) 2. An OR gate 3 is connected to the monostable multivibrator 2 which forms an addition circuit. A presettable down counter 4 is installed for counting the number of zero crossings of a signal (i.e., a tracking error signal which is hereinafter referred to as a "traverse signal") outputted when a light spot traverses tracks. The presettable down counter 4 counts the number of pulses outputted from an amplifier 5 which amplifies a high frequency band of the zero-crossed tracking error signal, i.e., pulses $P_t$ outputted whenever the traverse signal which is compared and outputted with a zero cross level by means of a comparator 6 and supplied to an edge pickup (sampler) circuit 7. A command signal is outputted to the track jump control circuit 1 when the presettable down counter 4 indicates a predetermined number $2N-1$ (N=the number of jumped tracks).

Figure 3:
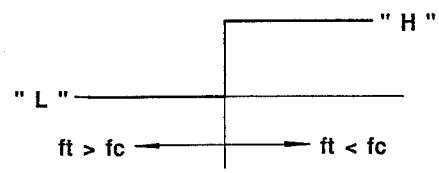
FIG. 3 is a characteristic graph on a phase comparator shown in FIG. 1.

A phase comparator 8 compares the output signal of the comparator 7 with a frequency of a reference clock signal source 9. The phase comparator 8 outputs a low level "L" signal or high level "H" signal depending on a frequency level of the traverse frequency $f_t$ with respect to the clock signal $f_c$ as shown in FIG. 3.

A signal level inverter 10 is connected to a switch $S_1$ for inverting a polarity of the signal derived from the OR gate 3. Numeral 11 denotes a tracking phase compensator for the tracking error signal (TE).

It is noted that a fine tracking actuator 12 is provided for controlling a laser spot irradiation toward an optical disc in a radial direction of the optical disc.

Next, an operation of the first preferred embodiment of the tracking accessing system will be described below with reference to FIGS. 2 (A) to 2 (H).

During the normal record or reproduction state, a switch $S_3$ is connected to a contact a while the tracking error signal TE is used to control the fine track actuator 12 via the phase compensator 11. Then, the tracking servo is applied so that the laser spot irradiates a center of a track of the optical disc.

In a case where the access is carried out for a target track during the tracking servo, a system controller (not shown) outputs a track jump instruction signal JS at a time $T_1$. At the same time, a seek on signal $S_{ON}$ is outputted so that a switch circuit $S_3$ is switched to a contact b. The switch circuit $S_2$ is switched in response to an F/R signal indicating a direction of a track jump (by a signal indicating an inner peripheral side of the disc (i.e., an inner radial direction) or i.e., an outer peripheral side (outer radial direction) of the disc). Therefore, the switch circuit $S_2$ selects a polarity of the jump signal.

In addition, when the jump instruction signal JS is inputted into the jump controlling circuit 1, the high-level jump control signal A/B is supplied to a drive end of a switch circuit $S_1$ to switch the switch $S_1$ into the contact a. An output pulse of a monostable multivibrator 2 triggered on a rising edge of the jump control signal A/B is supplied to the OR gate 3 and the actuator 12 via the switch circuits $S_1$, $S_2$, and $S_3$ as an initial acceleration pulse $M_1$ having a predetermined width determined by the retriggerable monostable multivibrator 2.

Therefore, the traverse signal $S_t$ outputted when the light spot traverses one of the tracks causes the output of a pulse signal $P_t$ through the comparator 6 and edge sampler 7 whenever it crosses zero. Then, the presettable down counter 4 counts the number of pulses denoted by $P_t$ and simultaneously the phase comparator 8 (digital circuit) compares the clock frequency $f_t$ derived from the reference clock pulse generator 9 denoted by PG.

The relative speed V immediately after the acceleration by means of the acceleration pulse $M_1$ is extremely large. The frequency $f_t$ of the traverse signal $S_t$ outputted at this time becomes higher than the clock frequency $f_c$. It is noted that a U.S. Pat. No. 4,473,274 issued on Sept. 25, 1984 exemplifies a structure of a fine track actuator 12 using an objective lens. The disclosure of the above-identified U.S. Patent is hereby incorporated by reference.

Therefore, since a low-level ("L") signal from the phase comparator 8 is inputted to the logic OR circuit 3 until time $T_3$, the output signal of the OR circuit 3 is turned to the low-level ("L"), the acceleration pulse is not applied to the actuator 12 and the actuator 12 is moved due to its inertia force. The relative speed V is therefore gradually reduced. It is noted that if $f_t < f_c$, the high level signal ("H") is outputted. If $f_t > f_c$, the low level signal ("L") is outputted from the phase comparator 8.

Consequently, whenever the movement speed of the actuator 12 due to its inertia force becomes slower, the output signal of the OR gate circuit 3 generates the acceleration pulse m so that the speed becomes constant. The actuator 12 is then actuated in response to a drive signal $P_C$ shown in FIG. 1.

Hence, during an interval from a time $T_2$ to $T_4$ during the track jump, a feedback servo such that the relative speed becomes constant is carried out.

In the preferred embodiment, when a difference between the address number read from the optical pick up before the track jump and address number of the target track indicates N, the number of the jumped tracks indicates N. At a time $T_4$ when the down counter 4 is loaded with $2N-1$ (preset to a value of $2N-1$) and the down counter 4 counts the number of $2N-1$, i.e., when the number of the jumped tracks indicates $N-0.5$, i.e., when the laser spot is placed on a center between the N number of tracks and $N-1$ number of tracks, the jump control signal A/B of the track jump control circuit 1 is switched to the low level ("L") in response to an output signal of the down counter 4. The level change of the down counter 4 causes the switch circuit $S_1$ to be switched into the contact b. Then, a divided voltage denoted by -E by means of resistors $R_1$ and $R_2$ causes a braking pulse $M_2$ to be outputted to the actuator 12.

It is noted that when a system controller (not shown) receives an output signal of the down counter 4 indicating that the down counter 4 counts $2N-1$, a1 is 1 is loaded from the system controller to the presettable down counter 4. Then, at a time $T_5$ when the presettable down counter 4 counts 1, i.e., a time $T_5$ when the laser beam (light spot) is placed on the N number track, the output signal from the presettable counter 4 is supplied to the system controller and a seek on (SEEK ON) signal derived from the system controller is turned to the low level ("L") and the switch circuit $S_3$ is switched to a contact a. Then, upon receipt of a falling edge of the SEEK ON signal, the switch circuit $S_1$ is switched to the contact c. A tracking servo state smoothly occurs on the N number track.

An output pulsewidth $P_m$ shown in FIG. 2 (D) of the monostable multivibrator 2 is preferably changed depending on the number of jumped tracks. For example, when the number of jumped tracks N is large, the pulsewidth $P_m$ becomes accordingly large, thus enabling the shortening of the access time.

In the first preferred embodiment described with reference to FIGS. 1 to 3, when an arbitrary number of tracks is preset to the presettable down counter 4, an arbitrary number of jumped tracks can be achieved.

Figure 4:
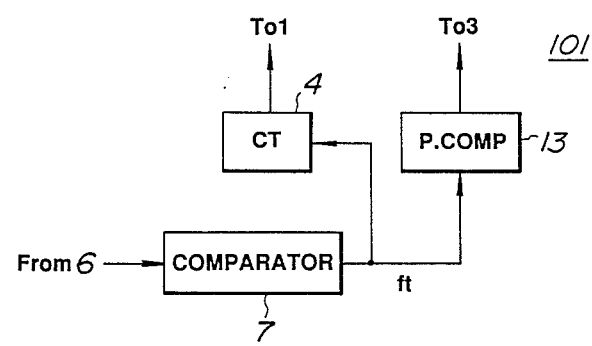
FIG. 4 is a schematic circuit block diagram of the accessing system for the optical disc apparatus in a second preferred embodiment according to the present invention.

FIG. 4 shows a second preferred embodiment of the track accessing system.

It is noted that the track accessing system in the second preferred embodiment has the same construction as the first preferred embodiment except the speed and traverse track detecting circuit 101.

In FIG. 4, a (retriggerable) monostable multivibrator 13 is installed for detecting the relative speed at the time of traverse over the tracks. A low-level signal having a predetermined width $t_{mo}$ as shown in FIG. 5 (B) is outputted from the retriggerable monostable multivibrator 13 whenever the monostable multivibrator 13 is triggered on rising and falling edges of the pulse signal $f_t$ derived as the result of the comparison of the traverse signal with zero level inputted from the comparator 7.

Figure 5A:
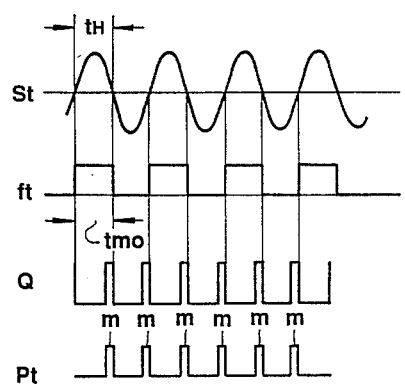
FIGS. 5 (A) and 5 (B) are signal waveform charts for explaining the operation of the system shown in FIG. 4.
Figure 5B:
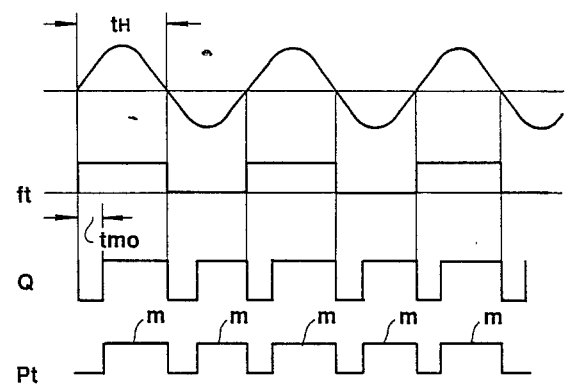

That is to say, at a stage of a relatively high frequency of the traverse signal $S_t$ detected after the acceleration pulse $M_1$ is outputted, as shown in FIG. 5 (A), an output pulsewidth $t_{mo}$ of the retriggerable multivibrator 13 is slightly narrower than a half period $t_H$ of the traverse signal, a duration of time during which its output Q becomes the high level becomes shorter, and an interval of time during which the acceleration pulse m of the drive signal $P_c$ becomes reduced.

Furthermore, as the frequency of the traverse signal $S_t$ becomes higher, the high level duration of time of the output Q becomes negligibly narrower so that no acceleration pulse m is outputted.

On the other hand, as the relative speed is reduced by a value lower than the predetermined speed, the high level duration of time becomes longer than the low level duration of time of the output Q as shown in FIG. 5 (B). The interval of time during which the acceleration pulse m of the drive signal $P_c$ is outputted is increased so that the movement speed of the actuator 12 is accordingly increased.

Hence, the relative speed V is controlled by means of a duty ratio of an output signal from the monostable multivibrator 13 in the same manner as in the first preferred embodiment.

Figure 9:
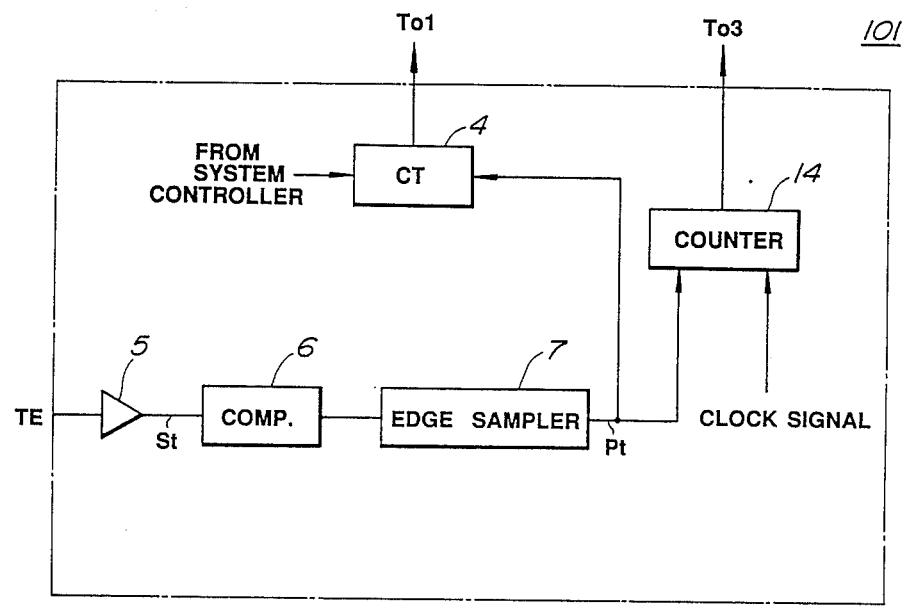
FIG. 9 is a schematic circuit block diagram of an alternative embodiment of a speed and traverse tracking detection circuit 101 shown in FIG. 1.

FIG. 9 shows a third preferred embodiment of the track accessing system.

It is noted that the construction other than the speed and traverse track detecting circuit 101 is the same as that shown in FIG. 1.

In the speed and traverse speed track detecting circuit 101, the pulse signal $P_t$ is inputted to a reset terminal of a counter 14 which counts the clock pulse signal. The counter 14 is preset with the count value such that the relative speed between the light spot and optical disc indicates a predetermined speed V. Hence, in a case where the light spot speed is slower than the predetermined speed V, a period of the pulse signal $P_t$ becomes longer. Therefore, the counter 14 indicates the count value of the clock signal exceeding the preset value while a carry signal having the high level ("H") is outputted therefrom. The high ("H") level carry signal is supplied to the logic AND gate circuit 3 to form the acceleration pulse m included in the drive signal $P_c$.

As described hereinabove, since in the track accessing system and method according to the present invention, the acceleration pulses are outputted in response to the jump instruction to accelerate the actuator 12 at a high speed in the radial direction of the optical disc and thereafter the control signal derived from the means for detecting the period of the traverse signal constituting the relative speed detecting means is used to control the relative speed so that a predetermined relative speed is obtained during an execution of track jump. Thus, the tracking servo can smoothly be applied to the target track and an access time can be shortened.

In addition, since the relative speed during the traverse is controlled through a closed servo loop, a stable and accurate access operation to access the target track can be achieved under no influence of a condition of the actuator at the time of jump and eccentricity of the optical disc.

What is claimed is:

1. A system for accessing tracks for an optical disc, comprising:
   (a) first means for generating and outputting an initial acceleration signal having a predetermined pulsewidth in response to a track jump instruction.,
   (b) second means for detecting a period of a traverse signal generated when a fine tracking actuator moves over tracks in a radial direction of the disc in response to the initial acceleration signal and outputting a control signal according to a result of detection, and
   (c) third means for supplying an acceleration pulse signal whose pulsewidth is controlled on the basis of the control signal outputted from the second means after the initial acceleration signal is outputted and for controlling a relative speed between a light spot and the optical disc to coincide with a predetermined speed in response to the acceleration pulse.

2. A system as set forth in claim 1, which further comprises fourth means for setting the number of tracks to be jumped.

3. A system as set forth in claim 2, wherein the fourth means includes a presettable down counter for counting the traverse signal.

4. A system as set forth in claim 3, wherein the presettable down counter is preset with a value of $2N-1$ with respect to the number of tracks N and counts decrementally whenever the traverse signal crosses zero.

5. A system as set forth in claim 1, which further comprises fourth means for setting the number of tracks to be jumped and fifth means for generating and outputting a deceleration signal and wherein when the fourth means indicates a value preset by the fourth means, a loop of the acceleration signal is interrupted so that the deceleration signal from the fifth means is supplied to the fine tracking actuator.

6. A system as set forth in claim 5, wherein the deceleration signal is supplied to the fine tracking actuator when the presettable down counter counts $2N-1$.

7. A system as set forth in claim 5, wherein a tracking error signal is supplied to the fine tracking actuator at the same time when the deceleration signal is interrupted.

8. A method for accessing tracks for an optical disc, comprising the steps of:
   (a) generating and outputting an initial acceleration signal having a predetermined time width in response to a track jump instruction,
   (b) detecting a period of a traverse signal generated when a fine tracking actuator moves over tracks in a radial direction of the disc in response to the initial acceleration signal and outputting a control signal according to a result of detection; and, (c) supplying an acceleration pulse signal whose pulsewidth is controlled on the basis of the control signal outputted after the initial acceleration signal is outputted and controlling a relative speed between a light spot and optical disc to coincide with a predetermined speed in response to the acceleration pulse signal.

* * * * *